United States Patent [19]

Okazaki et al.

[11] Patent Number: 4,724,201
[45] Date of Patent: Feb. 9, 1988

[54] PHOTORESPONSIVE MATERIAL

[75] Inventors: Masaki Okazaki; Akihiko Ikegawa; Haruo Takei, all of Kanagawa, Japan

[73] Assignee: Fuji Photo Film Co., Ltd., Kanagawa, Japan

[21] Appl. No.: 857,352

[22] Filed: Apr. 30, 1986

[30] Foreign Application Priority Data

May 1, 1985 [JP] Japan .................................. 60-92179

[51] Int. Cl.$^4$ .......................... G03C 1/02; G03C 1/08; G03C 1/12; G03C 1/19
[52] U.S. Cl. .................................. 430/570; 430/580; 430/583; 430/584; 430/585; 430/591; 430/592; 430/593; 548/157
[58] Field of Search .................. 430/82, 91, 92, 93, 430/94, 95, 570, 580, 584, 585, 591, 592, 593, 599, 510, 512

[56] References Cited

U.S. PATENT DOCUMENTS 3,063,838 11/1962 Jennings ............................. 430/510
4,283,488 8/1981 VanLare ............................. 430/580

Primary Examiner—Paul R. Michl
Assistant Examiner—Mark R. Buscher
Attorney, Agent, or Firm—Birch, Stewart, Kolasch and Birch

[57] ABSTRACT

A photoresponsive material containing a dye compound having a cyclodextrin or its derivative as a substituent. The photoresponsive material exhibits increased light absorptivity by increasing the amount of spectral sensitizer, the dye compound. The photoresponsive material is useful as a photographic emulsion and the like.

19 Claims, 2 Drawing Figures 4,724,201

PHOTORESPONSIVE MATERIAL

BACKGROUND OF THE INVENTION

1. Field of the Invention

This invention relates to a photoresponsive material having a novel dye compound, and more specifically, to a photoresponsive material containing a dye as a spectral sensitizer having a cyclodextrin or its derivative as a substituent.

2. Description of the Prior Art

Dyes have been used in photoresponsive materials for various purposes. One of these is use for spectral sensitization.

Since the technique of spectral sensitization by using a dye was discovered in the field of silver salt photography by H. W. Vogel in 1873, this technique has greatly developed as one of the important techniques. In the field of photoelectromotive force as well, application of this technique to various types of electrodes has been studied since Sheppard et al. published a study performed using a silverbromide electrode in 1940. In order to extend the range of light wavelength in which a photoresponsive material is responsive or restrict the range to a desired region, spectral sensitization of the material is a very important technique in the field of photoresponsive materials. Based on this background, fundamental and applied research into spectral sensitization have been extensively conducted. Among this research, elevation of the efficiency of spectral sensitization was very interesting from the view point of practical application of the technique.

One method for increasing the efficiency of spectral sensitization was to increase the amount of light utilized by increasing the amount of the dye contained in the material so as to increase its light absorptivity. In this method, it was a matter of course that the light absorptivity of the material could be increased by increasing the amount of the dye used for spectral sensitization. But, it was disappointing that the efficiency of spectral sensitization did not always elevate in proportion to the amount of the dye but it began to decrease after it exceeded a certain point. This fact was well known since it was first reported by Leermakers et al. in 1937. Then, a special method was proposed to solve this dilemma by using spectral sensitizing dyes coupled in advance in order and so arranged that the more remote the dye is from substrate, the higher the absorptivity to short wavelength light is, in order to increase the amount of light absorbed by the material and utilized for its spectral sensitization (in U.S. Pat. Nos. 3,622,317, 3,976,493 and 3,976,640).

The above conventional method was achieved by contriving a new arrangement of dyes but was not necessarily satisfactory for spectrally sensitizing a specific range of wavelengths of light. Therefore, it has been strongly demanded to develop a photoresponsive material the spectral sensitivity of which is elevated by a novel spectral sensitizer contained therein.

BRIEF SUMMARY OF THE INVENTION

After earnest study for solving the above problem, the inventors found that the spectral sensitizing efficiency of photoresponsive material such as silver-halide photosensitive material is elevated by a dye compound prepared by combining a cyclodextrin residue with a dye.

Accordingly, it is a first object of this invention to provide a new dye compound having a cyclodextrin or its derivative as a substituent.

It is a second object of this invention to provide a photoresponsive material with improved photosensitivity.

It is a third object of the invention to provide a photoresponsive material the spectral sensitivity of which is elevated by a novel spectral sensitizer contained therein.

It is a forth object of the invention to provide a photoresponsive material in which the light absorptivity is increased remarkably by increasing the amount of spectral sensitizer.

Other features and advantages of the invention will be apparent from the following description taken in connection with the accompanying drawing.

BRIEF DESCRIPTION OF THE DRAWINGS

For fuller understanding of the invention, reference is made to the following description taken in connection with the accompanying drawings, in which.

DETAILED DESCRIPTION OF THE INVENTION

Figure 1:
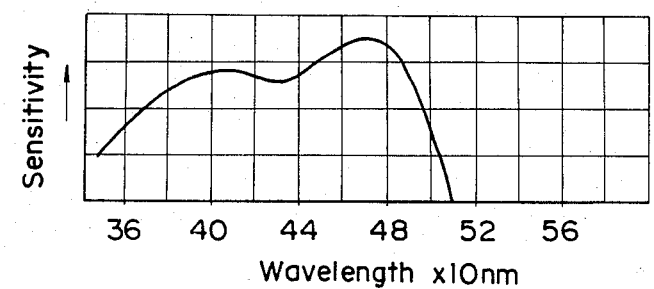
FIG. 1 is a graph showing the spectral sensitivity of a photoresponsive material containing illustrated compound (3)

This invention provides a photoresponsive material which contains a dye having a cyclodextrin or its derivative as a substituent.

In this specification and in the claims the terms "photoresponsive material" mean a material that can give, in response to a light as an information, an output in a mode such as a light, chemical change and electricity.

The cyclodextrin used in this invention is a compound including many D(+)-glucopyranose units bound together by 1,4-bondings to form a ring. The prefix in such compounds as α-cyclodextrin, β-cyclodextrin, γ-cyclodextrin... represents the number of glucose units constituting one molecule of the compound; α for six units, β for 7 units, γ for 8 units..., α-, β- and γ-dextrins are well known compounds which are commercially available. Alternatively, these compounds are called cyclohexaamylose, cycloheptaamylose and cyclooctaamylose. Derivatives of these cyclodextrins obtained by altering their hydroxyl group into an ether, an ester and an amino group are also well known. The details of these cyclodextrins are described in M. L. Bender and M. Komiyama *Cyclodextrin Chemistry*, Springer-Ferlag Co. (1978).

Examples of the dye which can be used for preparing the dye in this invention having a cyclodextrin or its derivative as a substituent (CD-dye hereafter referred to as dye compound) include cyanine dyes, merocyanine dyes, complex cyanine dyes, complex merocyanine dyes, holopolar cyanine dyes, hemicyanine dyes, styryl dyes and hemioxonol dyes. Among these dyes, those belonging to cyanine dyes, merocyanine dyes and complex merocyanine dyes are specially useful. Any basic heterocyclic nucleus usually used for cyanine dyes can be applied to these dyes. Examples of the applicable basic heterocyclic nuclei include a pyrroline nucleus, an oxazoline nucleus, a thiazoline nucleus, a selenazole nucleus, an imidazole nucleus, a tetrazole nucleus a pyridine nucleus and the like and those nuclei which are formed by the condensation between these nuclei and an alicyclic hydrocarbon ring. They also include those nuclei which are formed by the condensation between the above nuclei and an aromatic hydrocarbon ring such as an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a naphthoimidazole nucleus, a quinoline nucleus and an imidazo[4,5-b]qunioxaline nucleus. These nuclei may be bound to the carbon atom as a substituent.

Penta- and hexa-heterocyclic nuclei such as a pyrazolin-5-one nucleus, a thiohydantoin nucleus, a 2-thiooxazolidine-2,4-dione nucleus, a thiazolidine-2,4-dione nucleus, a rhodanine nucleus, a thiobarbituric acid nucleus, a 2-thioselenazolidine-2,4-dione nucleus, a pyrazolo[1,5-a]benzimidazole nucleus and a pyrazolo[5,1-b]quinazolone can be applied to merocyanine dyes or complex merocyanine dyes as nuclei having a ketomethylene structure. Further examples of dyes include azo dyes, anthraquinone dyes and those described in F. M. Hammer *"Heterocyclic compounds-cyanine dyes and related compounds-"* (John Willey and Sons Co., (New York, London) 1964.). Still further dyes oxonol, hemioxonol dyes, styryl dyes, merocyanine dyes, cyanine dyes and azo dyes can also be used. Further, in combination with the dyes above-described, fluorescent xanthene dyes and cyanine dyes can be used.

As mentioned above, the dye compound employed in this invention includes a cyclodextrin or its derivative coupled with a dye component through a suitable connecting group. It is desirable that the dye component is coupled to the carbon atom of the cyclodextrin to which originally a primary or secondary hydroxyl group, preferably a primary hydroxyl group, was bound. The chemical structure of the dye compound is represented by formula (I).

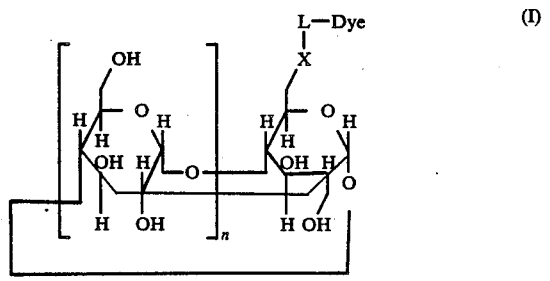

L: Connecting group
X: O, NR or S
n: An integral number of 5 or more

In the above formula (I), the hydroxyl group may be subjected to O-alkylation (such as methylation or ethylation) or O-acylation (such as acetylation or tosylation) and may be replaced by an amino group, an alkylamino group (such as methylamino group) or an acylamino group (such as acetylamino group).

In the above formula (I), connecting group (L) is represented by the following formula:

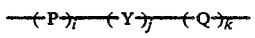

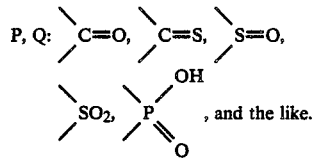

Y: substituted or unsubstituted alkylene, arylene or aralkylene, divalent heterocyclic ring, aromatic residue, and the like (The methylene group of alkylene or aralkylene may be replaced by

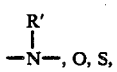

etc.) i, j, k: 0 or 1
R and R' represent a hydrogen atom, a substituted or unsubstituted alkyl, aryl or aralkyl group or a monovalent heterocyclic group.

In the following, examples of dye compounds used in this invention will be illustrated although this invention is not restricted to these examples. In the following illustrated compounds listed as examples, cyclodextrin residues are abbreviated according to number (n) as follows.

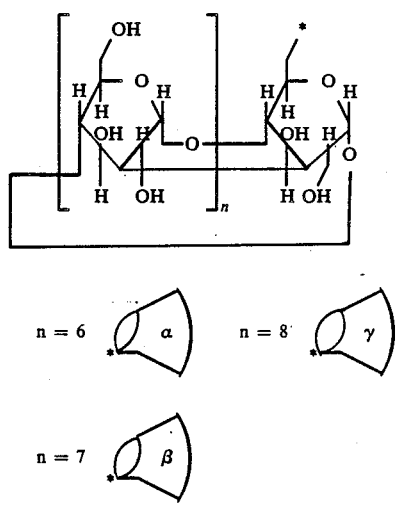

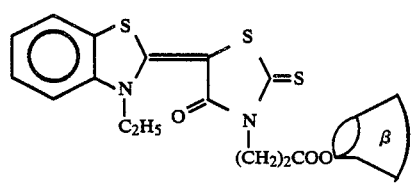

Illustrated Compound

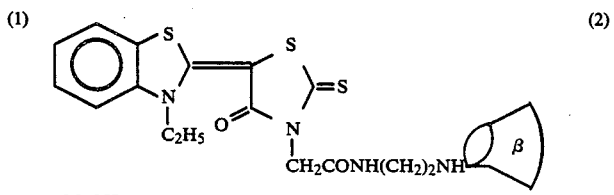

-continued
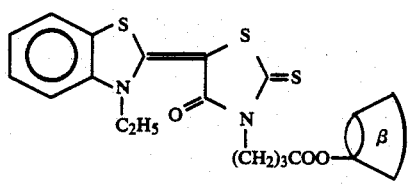
$\lambda_{max}^{MeOH} = 428$ nm (3)
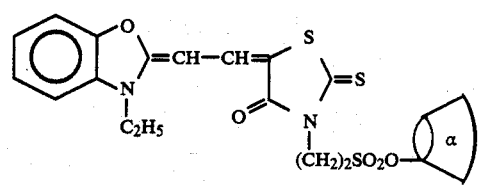
$\lambda_{max}^{MeOH} = 492$ nm (4)
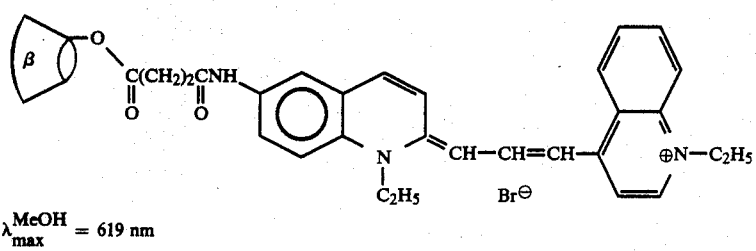
$\lambda_{max}^{MeOH} = 619$ nm (5)
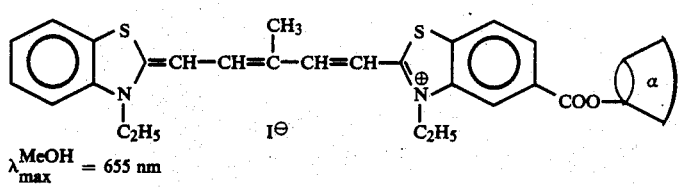
$\lambda_{max}^{MeOH} = 655$ nm (6)
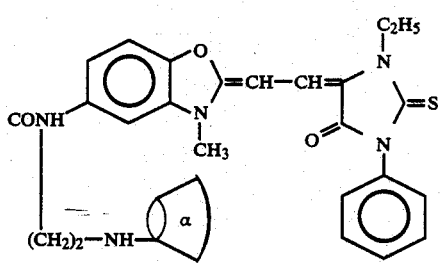
$\lambda_{max}^{MeOH} = 488$ nm (7)
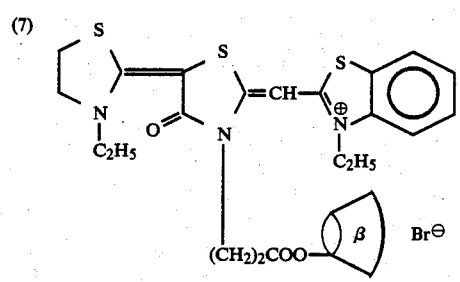
$\lambda_{max}^{MeOH} = 565$ nm (8)
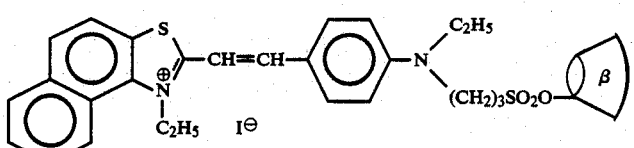
$\lambda_{max}^{MeOH} = 550$ nm (9)
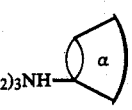
$\lambda_{max}^{MeOH} = 375$ nm (10)
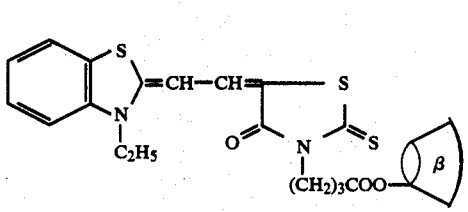
$\lambda_{max}^{MeOH} = 521$ nm (11)
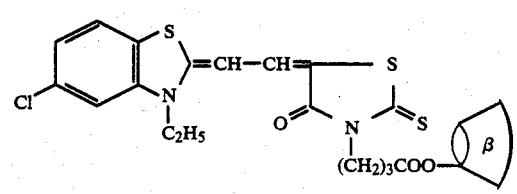
$\lambda_{max}^{MeOH} = 518$ nm (12)

These dye compounds can be synthesized either by synthesizing a dye moiety before coupling a cyclodextrin moiety or by synthesizing an intermediate coupled with cyclodextrins and then altering the intermediate to a dye.

When preparing the dye compound, a cyclodextrin or its derivative can be coupled with the dye by the following methods:

(1) Causing the dye to directly react with the hydroxyl group of the cyclodextrin to form an ester or ether bond.

(2) Converting the hydroxyl group of the cyclodextrin into an aryl sulfonate before it is caused to react with a carboxylate to form an ester bond.

(3) Converting the above aryl sulfonate into an amino group.

(4) Forming an amido group from the above amino group.

Further details of these methods are described in: R. Breslow and L. E. Overman *J. Am. Chem. Soc.*, 92 1075 (1970); Y. Matsui, T. Yokoi and K. Mochida *Chem. Lett.*, 1037 (1976).

The dye compound employed in this invention can be synthesized by causing the cyclodextrin to react with the dye in a molar ratio of preferably 20:1~1:8, more preferably 10:1~1:6 and most preferably about 1:1.

The synthesis of several dye compounds used in this invention will be described in the following.

SYNTHESIS OF ILLUSTRATED COMPOUND (1)

Into a solution prepared by dissolving 0.25 g of dicyclohexylcarbodiimide (DCC) there were added 5 mg of p-toluenesulfonic acid, 0.37 g of 3-carboxyethyl-5-(3-ethylbenzothiazolin-2-yridene)rhodanine (synthesized by the same method as that specified in F. M. Hammer "*Heterocyclic compounds-cyanine dyes and related compounds-*" (John Willey and Sons Co. (New York, London) 1964) and 1.38 g of β-cyclodextrin at room temperature. The mixture was stirred for two days. Next, after the reaction solution was filtered, the filtrate was concentrated to obtain a residue. The residue was purified by subjecting it to silica gel column chromatography (acetonitrile-methanol-water) and column chromatography performed using Sephadex LH-20 (trade name, manufactured by Pharmacia Fine Chemicals company) (methanol), to give 163 mg of illustrated compound (1).

yield, 11% melting point, 300° C.

SYNTHESIS OF ILLUSTRATED COMPOUND (2)

After 1.4 ml of isobutyl chloroformic acid and 1.4 ml of triethylamine were dropped at −20° C. into a solution prepared by dissolving 3.5 g of 3-carboxymethyl-5-(3-ethylbenzothiazolin-2-yridene)rhodanine (synthesized by the same method as that specified in the above literature "*Heterocyclic compounds-cyanine dyes and related compounds-*") into 50 ml of dimethylformamide, the mixture was agitated for one hour. Then 6.0 ml of absolute ethylenediamine was added to the reaction solution and the mixture was agitated overnight. After the reaction solution was filtered, the residue was recrystallized from chloroform-methanol to give 1.7 g of 3-(2-aminoethyl)carbamoylmethyl-5-(3-ethylbenzothiazolin-2-yridene)rhodanine.

After 0.15 g of sodium iodide was added to a solution prepared by dissolving 1.29 g of mono(6-0-tosyl)-β-cyclodextrin (synthesized by the method described in Y. Matsui, T. Yokoi and K. Mochida *Chem. Lett.*, 1037 (1976) in 10 ml of DMF, the mixture was agitated at 80° C. for two hours. Then, the reaction solution was combined with 3.94 g of 3-(2-aminoethyl)carbamoylmethyl-5-(3-ethylbenzothiazolin-2-yridene)rhodanine and the mixture was subsequently agitated at 80° C. for 60 hours. After the reaction solution was concentrated under reduced pressure, the residue was purified by subjecting it to silica gel column chromatography (acetonitrile-methanol-water) and column chromatography performed using Sephadex LH-20 (trade name, manufactured by Pharmacia Fine Chemicals company) (methanol), to give 150 mg of illustrated compound (2).

yield, 10% melting point > 300° C.

SYNTHESIS OF ILLUSTRATED COMPOUND (3)

The same method as that used for synthesizing illustrated compound (1) was performed except that 3-carboxylpropyl-5-(3-ethylbenzothiazolin-2-yridene)rhodanine was used instead of 3-carboxyethyl-5-(3-ethylbenzothiazolin-2-yridene)rhodanine, to give 228 mg of illustrated compound (3).

yield, 15% melting point > 300° C.

SYNTHESIS OF ILLUSTRATED COMPOUND (11)

After 40 ml of dimethylsulfoxide was added to 890 mg (2 millimoles) of the potassium salt of 3-(3-carboxypropyl)-5-[2-(3-ethylbenzothiazolin-2-yridene)ethylidene]rhodanine and 2.56 g (2 millimoles) of the 6-monotosylate of β-cyclodextrin, the mixture was heated and agitated at 90° C. for 5 hours. After the reaction solution is cooled, it was poured into 200 ml of ethyl acetate to form a precipitate. The thus formed precipitate was then repeatedly purified by column chromatography performed using Sephadex LH-20 (manufactured by Pharmacia company) as a carrier and a water-methanol mixture (1:1) as an eluent, to give 800 mg of the desired illustrated compound (11).

melting point, 284°~285° C.

$\lambda_{max}^{MeOH} = 521/nm$ ($\epsilon 7.63 \times 10^4$)

In the present invention, although there is no special restriction to the photoresponsive material including the dye compound, a silver halide, inorganic photosemiconductors such as a zinc oxide, titanium oxide, cadmium sulfide, selenium, an alloy composed of selenium and tellurium or organic semiconductors such as polyvinylcarbazoles and arylamines can be preferably used for the photoresponsive material.

In the present invention, the amount of the dye compound can be properly determined according to the use of the photoresponsive material. When the above dye compound is used as a spectral sensitizer in a photoresponsive material made of a silver halide emulsion, the silver halide emulsion contains per 1 mole of silver halide $1 \times 10^{-6}$ moles ~ $5 \times 10^{-3}$ moles, preferably $1 \times 10^{-5}$ moles ~ $2.5 \times 10^{-3}$ moles and more preferably $4 \times 10^{-5}$ moles ~ $1 \times 10^{-3}$ moles of the dye compound.

The dye compound used in the present invention can be directly dispersed in a photoresponsive material (e.g., a silver halide emulsion). Alternatively, the dye compound can be added in the form of a solution prepared by dissolving it in a suitable solvent such as methyl alcohol, ethyl alcohol, methyl cellosolve, water, pyridine or one of the mixtures of these solvents. When mixing the dye compound into the photoresponsive material by one of these methods, the space regulator specified in a Ueno et al. *J. Chem. Soc. Chem. Comm.*, P. 194 (1981) may be jointly used.

When the photoresponsive material is a silver halide emulsion the dye compound can be added to by any of the following methods in which the dye compound is dissolved by ultrasonic wave:

(1) As disclosed in the specification of U.S. Pat. No. 3,469,987, dissolving the dye compound in a volatile organic solvent before the solution is dispersed in a hydrophilic collid and then adding the thus prepared dispersion to the emulsion.

(2) As disclosed in Japanese Patent Publication No. 24185/1971 directly dispersing the water-insoluble dye compound into a water-soluble solvent and then adding the thus prepared dispersion to the emulsion.

(3) As disclosed in the specification of U.S. Pat. No. 3,822,135, dissolving the dye compound into a surfactant and then adding the thus prepared solution to the emulsion.

(4) As disclosed in Japanese patent application (OPI) No. 74624/1976, dissolving the dye compound into a compound which causes red shift of the dye compound and then adding the thus prepared solution to the emulsion.

(5) As disclosed in Japanese patent application (OPI) No. 80826/1975, dissolving the dye compound into a water-free acid and then adding the thus prepared solution to the emulsion. Additionally, it is also possible to add the solution of the dye compound to the emulsion by one of the methods disclosed in U.S. Pat. Nos. 2,912,343, 3,342,605, 2,996,287 and 3,429,835.

When preparing the photoresponsive material according to this invention, any combination of at least two dye compounds can be used or any dye compound can be used solely.

In the present invention it is possible to combine the dye compound in this invention with another sensitizing dye. For example, those dyes include those disclosed in U.S. Pat. Nos. 3,703,377, 2,688,545, 3,397,060, 3,615,635 and 3,628,964, British Pat. Nos. 1,242,588 and 1,293,862, Japanese Patent Publication Nos. 4936/1968, 14030/1969 and 10773/1968, U.S. Pat. No. 3,416,927, Japanese Patent Publication No. 4930/1968, U.S. Pat. Nos. 3,615,613, 3,615,632, 3,617,295 and 3,635,721.

The silver halide emulsion employed in this invention is usually prepared by mixing a solution of a water soluble silver salt (such as silver nitrate) with a solution of a water soluble halide salt (such as potassium bromide) in the presence of a solution of a water soluble high molecular compound such as gelatin. For the above silver halide, silver chloride and silver bromide as well as mixed silver halides such as silver chlorobromide, silver iodobromide and silver chloroiodobromide can be used. It is preferable that the average size of silver halide grains (grain diameter for sphere or spheroids and edge length for cubes, represented by the average of the projected surface areas of the grains) be at most 4 $\mu$m. The grain size distribution can be either narrow (so-called "monodisperse emulsion") or wide.

The shape of silver halide grains may be hexagonal, quadrodecahedral, rhombododecahedral, octahedral, a combination of these crystalline forms, spheroidal or planar.

In the emulsion for this invention, tabular silver halide grains the diameter of which is at least 5 times their thickness may occupy at least 50% of the total projected surface area of the silver halide grains. Details about this point are described in the specifications of Japanese patent application (OPI) Nos. 127921/1983 and 113927/1983.

A combination of at least two silver-halide photographic emulsions separately prepared, may be used to prepare the emulsion for this invention. The crystalline structure of the silver halide grains may be uniform from its outer area to its inner area or may have different halogen compositions between an inner and an outer layer. It may also be of so-called conversion type as specified in British Pat. No. 635,841 and U.S. Pat. No. 3,622,318. The silver halide grain may be of the type which forms a latent image mainly in the surface or of the type which forms a latent image in the inner area.

These photographic emulsions can be prepared by the methods disclosed in James "*The Theory of the Photographic Process*" The 4th edition Mac Millan (1976), P. Glafkides, "*Chimie et Physique Photographique*" (Paul Montel, 1967), G. F. Duffin, "*Photographic Emulsion Chemistry*" (The Focal Press, 1966), V. L. Zelikman et al, "*Making and Coating Photographic Emulsion*" (The Focal Press, 1964). Namely, they can be prepared by any of an acid method, a neutral method or an ammonia method. Further as a method causing a soluble silver salt to react with a soluble halogen salt, a single-jet process, a double-jet process and a combination of these processes can be employed.

It is also possible to form silver halide particles in the presence of an excessive amount of silver ions (so-called reverse mixing method). One of the double-jet processes is the so-called controlled double jet method which consists of maintaining pAg in the liquid phase in which a silver halide is formed. By this method, a silver halide emulsion containing regular crystals with almost equal grain sizes can be obtained.

The emulsion for this invention may be prepared by mixing two or more types of silver halide emulsions prepared separately.

Although it is possible to use a so-called primitive emulsion which has not undergone any chemical sensitization as the silver halide emulsion, usually a chemically sensitized emulsion is used. The chemical sensitization of the emulsion can be attained by the method disclosed in the aforementioned literature written by Glafkides or Zelikman or in H. Freezel "*Die Grundlagen der photographischen Prozesse mit Silberhalogeniden*" (Akademische Verlagsgesellschaft, 1968).

Namely, any of the following methods may be used alone or in combination: (1) sulfur sensitization method using a sulfur compound which can react with active gelatin or silver (such as a thiosulfate, a thiourea, a mercapt compound or a rhodanine), (2) reduction sensitization method using a reducing compound (such as a stannous salt, an amine, a hydrazine derivative, formamidinesulfinic acid or a silane compound) and (3) noble-metal sensitization method using a noble metal compound (such as a gold compound or a complex salt of a group VIII metal such as platinum, iridium or paladium).

As a binder or a protective colloid used in the photosensitive material, gelatins can be advantageously used and other hydrophilic colloids can also be used. Alkali-treated gelatin, acid-treated gelatin and gelatin derivatives can be used as the gelatin.

When the photoresponsive material of this invention is a silver-halide photographic emulsion, various other additives are also used. For example, a color coupler (such as yellow coupler, magenta coupler or cyanic coupler), a fluorescent brightening agent (such as a stilbene-system compound), an antifoggant, a stabilizer (such as 1-phenyl-5-mercaptotetrazole or 4-hydorxysubstituted (1, 3, 3a, 7) tetraazaindene), a desensitizer, a hardener (such as 1, 3, 5-triacryloyl-hexahydro-s-triazine or 2,4-dichloro-6-hydroxgy-s-triazine), a coating aid, an antistatic agent, a plasticizer, a lubricant, a matt agent, a development accelerator, an oil (such as an alkyl phthalate ester or a phosphate ester), a mordant, an ultraviolet-ray-absorbing agent, a image dye stabilizer (such a hydroquinone derivative), an antistain agent (such as a hydroquinone derivative) and an antifungal agent (such as a 2-thiazolylbenzimidazole or an isothiazolone) are used as additives contained in the photosensitive material. And, those additives disclosed in *Research Disclosure* Vol. 176 P. 22~31 (RD-17643) (December 1978) can be also used.

The finished emulsion is applied to a suitable base such as baryta paper, resin-coated paper, synthetic paper, triacetate film, polyethylene terephthalate film and other plastic sheet or glass plate by a suitable method such as dip coating, air knife coating, curtain coating and extrusion coating (performed using a hopper and disclosed in U.S. Pat. No. 2,681,294), thereby obtaining a photographic material.

Various types of color and black and white photographic materials can be prepared from the photographic emulsion of this invention.

They include color photographic film (for general use, for motion picture film, etc.), color reversal film (for slide use or for motion picture film, a coupler is contained when needed), color photographic paper, color positive film (for motion picture), color reversal photographic paper, color photosensitive material for thermal development, color photosensitive material prepared by the silver dye bleaching method, photographic material for preparing printing plate (lith film, scanner film, etc.), X-ray photographic material (for direct or indirect medical use, industrial use, etc.) black and white negative photographic film, black and white photographic paper, micro photosensitive material (for COM, microfilm, etc.), color diffusion transfer photosensitive material (DTR), silver salt diffusion transfer photosensitive material and print-out photosensitive material.

When the photoresponsive material of this invention is photosensitive material it can be processed by any well-known method and any known processing solution can be used. The temperature of the solution is usually between 18° C. and 50° C., but can be lower than 18° C. or higher than 50° C. According to purpose, either development treatment for forming recording images (black and white photographic treatment) or color photographic treatment consisting of development treatment for dye images can be applied.

Further, the details of the method for development treatment are described in *Research Disclosure No.* 176 P. 28~30 (RD-17643) (December 1978).

According to the present invention, a photoresponsive material with high spectral sensitization efficiency and improved photosensitization efficiency can be prepared by using a novel dye compound having a cyclodextrin or its derivative as a substituent.

The photoresponsive material of this invention can be utilized in the fields of photosensitive materials, optical filters, non-linear optical materials and the like.

In this invention, although it has not yet been clarified why high spectral sensitization efficiency is attained by using the novel dye compound (CD-dye), it appears that as the dye section is included in the cyclodextrin to form a clathrate compound and improved light absorptivity of the material is achieved without desensitizing it by the dye.

In the following, this invention will be explained in more detail according to examples. However, this invention is not restricted to these examples.

EXAMPLE 1

Each given quantity (shown in Table 1) of illustrated compound (3), the dye compound of this invention, was added to a silver chlorobromide emulsion prepared by a conventional method (composed of 70 mole% of silver chloride and 30 mole% of silver bromide) to prepare photographic emulsions. And each given quantity (shown in Table 1) of the conventional dye (A) was added to the same silver chlorobromide emulsion to prepare photographic emulsions. Then, each of these emulsions was coated on a triacetate fiber film base, to prepare samples No. 2~9. In addition, an emulsion containing no dyes was coated on a triacetate film base to prepare sample No. 1.

Part of each of these samples was exposed to radiation through an optical wedge with a light source at a color temperature of 2,854° K., and the remaining part was exposed to radiation through a spectral camera to obtain a spectrograph.

After the exposure, each sample was developed for 2 minutes at 20° C. in a solution of the following composition. Then a densitometer (manufactured by Fuji Photographic Film company) was used to measure sensitivity and fogging. The sensitivities were determined by using an optical density of [fogging+1.5] as the standard point. The thus obtained results are shown in Table 1 as relative values.

| Composition of the Developing solution | |
|---|---|
| Water | 700 ml |
| N—Methyl-p-aminophenol sulfate | 3.1 g |
| Anhydrous sodium sulfite | 45 g |
| Hydroquinone | 12 g |
| Sodium carbonate (monohydrate) | 79 g |
| Potassium bromide | 1.9 g |

The total volume is adjusted to 1 l by adding water.

A solution was prepared immediately before by combining 2 parts by volume of water and 1 part by volume of the developer.

TABLE 1

| Sample No. | Spectral sensitizer and Its Amount Used ($\times 10^{-5}$ mole/kg emulsion) | | Relative Sensitivity | Fogging | |
|---|---|---|---|---|---|
| 1 | | | 100 | 0.05 | |
| 2 | (3) | 4 | 141 | 0.05 | This invention |
| 3 | " | 8 | 182 | 0.05 | " |
| 4 | " | 16 | 219 | 0.05 | " |
| 5 | " | 32 | 219 | 0.05 | " |
| 6 | (A) | 4 | 141 | 0.05 | Comparative |
| 7 | " | 8 | 174 | 0.05 | " |
| 8 | " | 16 | 191 | 0.05 | " |
| 9 | " | 32 | 166 | 0.05 | " |

Chemical structure of the reference spectral sensitizer (A)

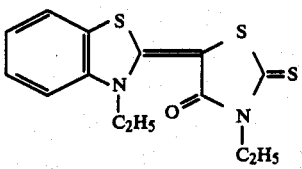

From the results shown in the above table, it is apparent that the relative sensitivity of the photosensitive material of this invention containing a dye command proportionally increases and elevates to a high level as the amount of the compound increases. In contrast, high relative photosensitivity of a material containing a conventional dye is not attained even when its amount is increased.

In FIG. 1, a graph of the spectral sensitivity of Sample No. 4 was shown.

EXAMPLE 2

Film samples Nos. 1~4 were prepared by the same method as that used in example (1) except that given amounts (shown in Table 2) of illustrated compound (12) were added instead of illustrated compound (3). And, film samples Nos. 5~8 used as references were prepared by coating photographic emulsions prepared by adding given amounts (shown in Table 2) of dye (B). The photosensitivities of these samples were measured by treating them in the same manner as that used in example (1) except that the films were exposed for 5 seconds to tungsten light (5,400° K.) passed through a yellow filter SC-46 (which passes light with a wavelength greater than 460 nm). The results are shown in Table 2.

TABLE 2

| Sample | Dye and Its Amount Used × $10^{-5}$ mole/ kg emulsion | | Relative Sensitivity | Fogging | |
|---|---|---|---|---|---|
| 1 | | | | 0.05 | |
| 2 | (12) | 32 | 158 | 0.05 | This invention |
| 3 | " | 64 | 148 | 0.05 | " |
| 4 | " | 128 | 115 | 0.05 | " |
| 5 | (B) | 16 | 100 | 0.05 | Comparative |
| 6 | " | 32 | 100 | 0.05 | " |
| 7 | " | 64 | 105 | 0.08 | " |
| 8 | " | 128 | 28 | 0.11 | " |

Chemical structure of the comparative dye (B).

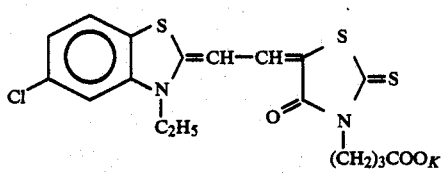

The results shown in the above table indicate that, as compared to a conventional dye, the sensitizing dye of this invention has higher sensitivity and forms less fogging even if the amount added increases.

Figure 2:
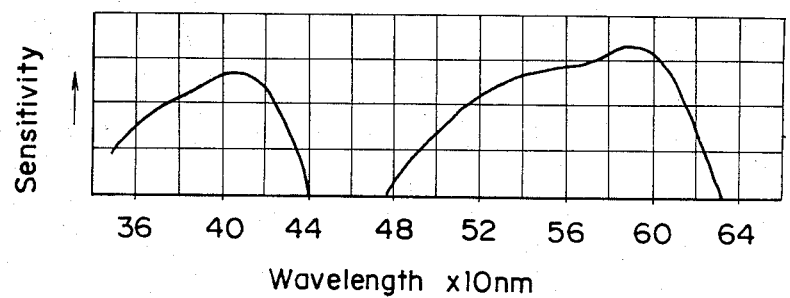
FIG. 2 is a graph showing the spectral sensitivity of a photoresponsive material containing illustrating compound (12)

In FIG. 2, a graph of the spectral sensitivity of Sample No. 2 was shown.

As many apparently widely different embodiments of this invention may be made without departing from the spirit and scope thereof, it is to be understood that the invention is not limited to the specific embodiments thereof except as defined in the appended claims.

What we claim is:

1. A spectrally sensitized silver halide photoresponsive material comprising a substrate and a silver halide layer containing an effective amount of a dye compound having a cyclodextrin or its derivative portion as a substituent for increasing the efficiency of spectral sensitization.

2. The photoresponsive material as set forth in claim 1, wherein the photoresponsive material is a silver halide photographic material.

3. The photoresponsive material as set forth in claim 1, wherein the dye component of the dye compound is a polymethine dye.

4. The photoresponsive material as set forth in claim 1, wherein the photoresponsive material is a silver halide photographic material and the dye component of the dye compound is a polymethine dye.

5. The photoresponsive material as set forth in claim 4, wherein the polymethine dye is a merocyanine dye.

6. The photoresponsive material as set forth in claim 5, wherein the merocyanine dye is a simple merocyanine dye.

7. The photoresponsive material as set forth in claim 6, wherein the simple merocyanine dye is a 5-(3-alkyl-benzothinazoline-2-iridene)rhodanine derivative.

8. The photoreponsive material as set forth in claim 1, wherein the following compound is used as the dye compound and the photoresponsive material is a silver halide photographic material

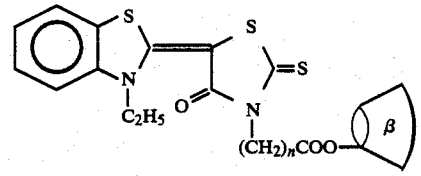

n=2, 3

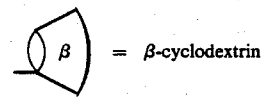 = β-cyclodextrin

9. The photoresponsive material as set forth in claim 3, wherein the polymethine dye is a merocyanine dye.

10. The photoresponsive material as set forth in claim 9, wherein the merocyanine dye is a simple merocyanine dye.

11. The photoresponsive material as set forth in claim 10, wherein the simple merocyanine is a 5-(3-alkylbenzothiazoline-2-iridene)rhodanine derivative.

12. The photoresponsive material as set forth in claim 1, wherein the following compound is used as the dye compound

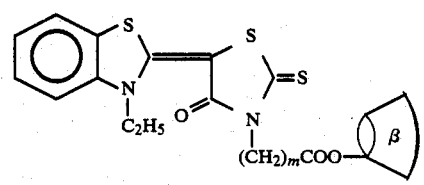

-continued m = 2,3

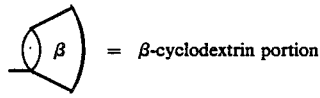 = β-cyclodextrin portion

13. The photoresponsive material as set forth in claim 1, wherein the cyclodextrin is α-, β- or γ-cyclodextrin.

14. The photoresponsive material as set forth in claim 1, wherein the dye component is coupled to the carbon atom of the cyclodextrin to which originally a primary or secondary hydroxyl group was bound.

15. The photoresponsive material as set forth in claim 1, wherein the dye compound is represented by the following formula

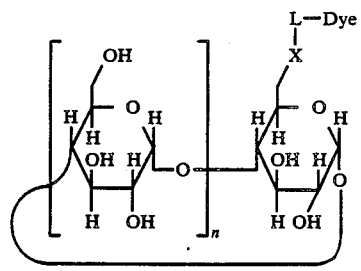

wherein L represents a connecting group; X represents O, NR or S and n represents an integral number of 5 and more, wherein R denotes a hydrogen atom, a substituted or unsubstituted alkyl, aryl or aralkyl group or a monovalent heterocyclic group.

16. The photoresponsive material as set forth in claim 1, wherein the molar ratio of cyclodextrin or its derivative to the dye component of the dye compound is in the range of 20:1∼1:8

17. The photoresponsive material as set forth in claim 1, wherein the photoresponsive material is a silver halide photographic material containing $1 \times 10^{-6} \sim 5 \times 10^{-3}$ mole/mole-Ag of the dye compound.

18. The photoresponsive material as set forth in claim 1, wherein the dye compound is a spectral sensitizer.

19. The photoresponsive material as set forth in claim 15, wherein connecting group L is represented by the formula

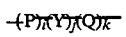

P and Q are selected from the group consisting of

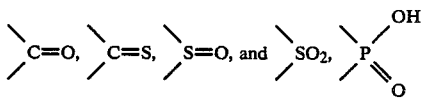

Y is a substituted or unsubstituted alkylene, arylene or aralkylene, divalent heterocyclic ring, or aromatic residue, i, j, and k is 0 or 1, and R represents a hydrogen atom, a substituted or unsubstituted alkyl, aryl or aralkyl group or a monovalent heterocyclic group.

* * * * *